UNITED STATES PATENT OFFICE.

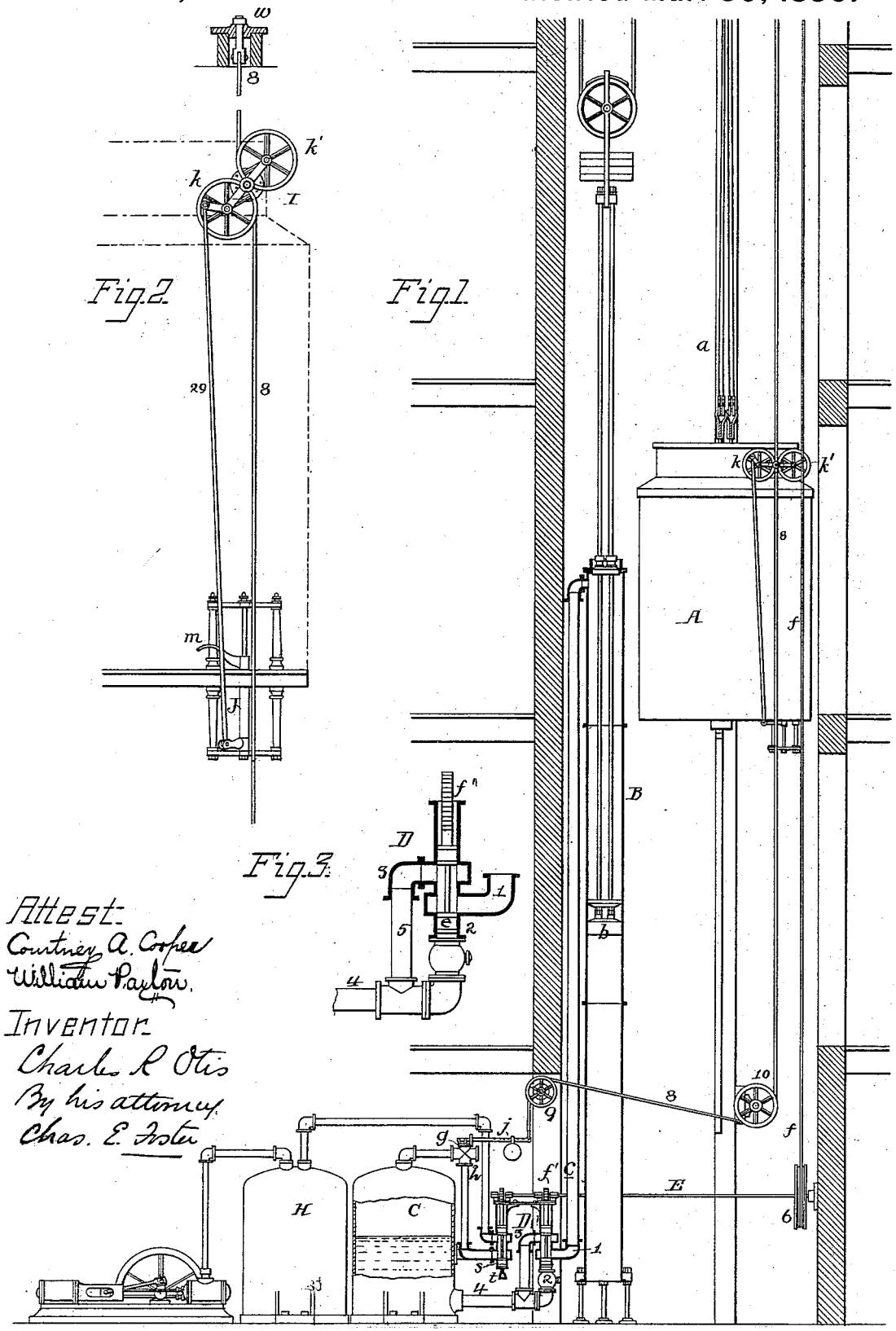

CHARLES R. OTIS, OF NEW YORK, N. Y.

ELEVATOR.

SPECIFICATION forming part of Letters Patent No. 226,100, dated March 30, 1880.

Application filed November 29, 1879.

*To all whom it may concern:*

Be it known that I, CHARLES R. OTIS, of the city, county, and State of New York, have invented an Improvement in Elevators, of which the following is a specification.

My invention consists in the arrangement of certain passages and valves and appliances, and in their combination with the engine and the cage of an elevator, whereby the movements of the cage and the amount of power applied to effect these movements may be regulated, so as to avoid the too sudden starting or stopping of the cage and the waste of power.

The further object of my invention is to utilize, to as great an extent as possible, the expansive power of an elastic motor fluid.

Although my invention is applicable to elevators driven by various kinds of engines and different motor fluids, the drawings forming part of this specification illustrate an arrangement peculiarly adapted to the use of an elastic fluid as a motor—

Figure 1 being an elevation, partly in section; Fig. 2, a detached view of appliances connected with the cage; Fig. 3, a detached view of the starting and stopping valve and its connections.

The cage A is suitably guided and suspended by cables $a$, connected with the winding-drum, or, as shown, with the piston $b$, of a hydraulic engine, the cylinder B being vertical and communicating at the upper end with a pipe, $c$, leading to a water-supply main or tank, C, from which water passes to the cylinder under pressure. Between the tank C and pipe $c$ is arranged the valve-chest D, having three branches, 1 2 3, the first communicating with the pipe $c$, the second with the pipe 4, leading to the tank C, and the third with a pipe, 5, leading to the pipe 4.

The valve $e$ is connected to the stem $f'$, and so arranged that when in the position shown there will be a communication between the pipe $c$ and tank C through the pipes 4 5. When further elevated the valve $e$ will close the end of the pipe $c$. When further raised the water may pass, through the pipes 2 4, back to the tank or to an escape-pipe.

The valve is operated from a shaft, E, a pinion on which gears with a rack of the valve-spindle, the said shaft being turned by means of a stopping and starting rope, $f$, passing round a pulley, 6, on the shaft, through the cage, and round a pulley above the upper floor.

The construction above described does not differ materially from that adopted in elevators heretofore in use, and is open to the objection that, should the operator open the valve too wide or open or close it too suddenly, the cage will stop or start abruptly with an uncomfortable jerk, which subjects the supporting devices to a severe strain. Another objection is, that as great a pressure is employed in elevating the cage when empty as when it is heavily loaded, with a consequent undue increase of speed and waste of power. To avoid this I insert a valve in one of the pipes to control the passage through which the motor fluid flows from the supply-pipe, boiler, or reservoir toward the stopping and starting valve and cylinder, and with this valve I connect a rope or other operating appliance leading to the cage. For instance, an electrical connection may be used.

In the apparatus shown in the drawings the valve $g$ is arranged in a pipe, $h$, leading from the air-reservoir H, which is supplied by a suitable engine to the air and water tank C. The valve is closed against its seat by a weighted lever, $j$, to which is connected an operating-rope, 8, leading round pulleys 9 10, through the cage, and fastened at the upper end to an adjustable bolt or other device, $w$, whereby the rope may be lengthened and shortened, as may be necessary for the proper working of the valve.

The valve may close tightly on its seat, or a slight opening may be made in it, or any suitable means adopted to prevent absolute contact with its seat, so that there will always be a contracted channel for the passage of the motor fluid.

If the valve $g$ is slightly raised, and the valve $e$ is moved to permit the water to flow toward the piston, such flow will be slow and the cage will s'art without the sudden jerk and strain that would otherwise result, and should there be no load upon the cage the pressure will often be sufficient to continue the movement at the proper speed. When, however, the cage is loaded, or a greater speed is necessary, the operator, by drawing upon the rope 8, further opens the valve $g$, when pressure will be exerted proportioned to the extent to which the valve is opened. To enable the operator to adjust and hold the valve in any position while the cage is in operation, I carry the rope 8 round or between two pulleys, $k$ $k'$, which are combined with adjusting devices whereby they may be moved to tighten or slacken the rope, while the latter can move readily independently of the pulleys. Thus both pulleys may turn in a frame, I, pivoted to the cage, so as to swing to either of the positions shown in Figs. 1 and 2, the former permitting the cage to travel without any action upon the rope, the latter bending the rope so as to lift the valve.

The frame I is connected, by a rod, 29, to a slide, J, extending through the floor of the cage, suitably guided and provided with a foot-rest, $m$, so that the operator, by placing his foot upon the rest, may tighten the rope or open or close the valve to any desired extent, and maintain it in position without interfering with his operations with the stopping and starting rope. It will, however, be apparent that various other appliances may be used for operating the valve.

In the apparatus shown, where a body of water intervenes between the piston and the air or other elastic motive fluid, it is sometimes necessary to discharge the air as the water moves back into the tank C on the descent of the cage. For this purpose a valve, $s$, is used, which opens communication between the pipe and the tank C when down, and closes said communication and uncovers the discharge-opening $t$ when raised. As these operations should be simultaneous with the opening and closing of the valve $e$, the spindle of the valve $s$ is provided with a rack gearing with a second pinion on the shaft E, so that the turning of the shaft will effect both operations, the valve $s$ being raised to permit the air to escape from the tank through the opening $t$ whenever the valve $e$ is raised to permit the water to flow from the piston to the tank through pipes 2 4.

The valve $g$ may be moved automatically by connecting it to a governor or other apparatus operated by the movement of the cage.

It will be apparent that, even when the valve $g$ is closed, there will be a body of air or other elastic fluid confined under pressure in the tank C, that on opening the valves $e$ this air will act expansively to elevate the cage, and that where the load decreases (as by the discharge of passengers at different heights) the movement of the cage can be continued by the expansive action, with but little, if any, direct propulsion, of the air from the main reservoir or compressor. The valve $g$ can therefore be manipulated so as to enable the cage to be operated either directly from the air propelled from the compressor or by expansion of air accumulated under pressure in the tank, which accumulation of pressure may be due either to the movement of the cage in descending or to the action of the air-compressor while the cage is at rest, or to both.

I do not here claim the combination of the valves $e$ $s$ and their operating appliances, as these features will form the subject of a separate application for Letters Patent.

Without limiting myself to any special motor or engine for raising the cage, I claim—

1. The combination, with the cage of an elevator, of a valve arranged in the passage through which the non-elastic fluid flows to and from the piston, a valve, $g$, arranged in the passage for the motor fluid, and appliances whereby said valves may be controlled by the attendant from the cage, substantially as set forth.

2. The combination, in an elevator, of the stopping and starting valve, valves $s$ and $g$, arranged between the stopping and starting valve and the reservoir, main, or boiler, and valve-operating appliances extending from said valves to the cage and under the control of the attendant therein, substantially as set forth.

3. The combination of the air and water tank, stopping and starting valve, and valve $g$, and operating appliances under the control of the operator in the cage, all arranged to permit the expansive action of the air to be utilized, substantially as set forth.

4. The combination, with the cage of an elevator, and with the elevating mechanism and stopping and starting appliances, of a valve arranged to permit when down a limited flow of the motor fluid, and connections whereby the valve may be moved from the cage, substantially as set forth.

5. The combination, with the valve-rope 8, of the pulleys $k$ $k'$ and foot-piece $m$, connected to the frame of said pulleys, and arranged substantially as set forth.

In testimony whereof I have signed my name to this specification in the presence of two subscribing witnesses.

CHAS. R. OTIS.

Witnesses:
F. P. HOENEMAN,
JOHN A. FINCKE.